United States Patent [19]

Merten et al.

[11] 3,790,407

[45] Feb. 5, 1974

[54] RECORDING MEDIA AND METHOD OF MAKING

[75] Inventors: Ronald A. Merten; Don E. Pickart, both of Boulder, Colo.

[73] Assignee: International Business Machines Corporation, Armonk, N.Y.

[22] Filed: Dec. 28, 1970

[21] Appl. No.: 102,127

[52] U.S. Cl. .................. 117/240, 117/234, 117/235

[51] Int. Cl. ............................................ H01f 10/02

[58] Field of Search ....... 117/235, 240, 234, 100 M; 252/62.54

[56] References Cited

UNITED STATES PATENTS

| | | | |
|---|---|---|---|
| 3,525,694 | 8/1970 | Bisschops et al. | 117/235 |
| 3,139,354 | 6/1964 | Wolff | 117/235 |
| 3,592,687 | 7/1971 | Schnell et al. | 117/235 X |
| 2,106,882 | 2/1938 | Betz | 117/235 X |
| 3,389,105 | 6/1968 | Bolger | 117/100;100 X |
| 2,954,552 | 9/1960 | Halpen | 117/100 X |
| 3,245,826 | 4/1966 | Luce et al. | 117/240 X |
| 3,503,882 | 3/1970 | Fitch | 117/240 X |
| 2,418,479 | 4/1947 | Pratt et al. | 117/240 X |
| 2,570,856 | 10/1951 | Pratt et al. | 117/240 X |
| 3,015,627 | 1/1962 | Ayers et al. | 117/235 X |
| 3,047,428 | 7/1962 | Goto et al. | 117/235 X |
| 3,574,685 | 4/1971 | Haines | 117/235 X |
| 1,912,887 | 6/1933 | Chipman | 117/239 X |

OTHER PUBLICATIONS

Friedman et al., IBM Tech. Dis. Bull., Vol. 9, No. 7, Dec. 1966, p. 779.

*Primary Examiner*—William D. Martin
*Assistant Examiner*—Bernard D. Pianalto
*Attorney, Agent, or Firm*—Hanifin and Jancin; Donald W. Margolis

[57] ABSTRACT

High coercivity metallic magnetic material in finely divided particle form is milled with a lubricant to convert it to a leafing flake. The flakes thus obtained are mixed with a suitable binder vehicle and solvent and coated on a non-magnetic substrate to form a leafed coating in which most of the magnetic flakes float to the surface of the vehicle to form a relatively continuous thin layer of high coercivity magnetic material. When the binder vehicle is dried or cured it firmly adheres the thin layer of magnetic material to the substrate and also provides adhesion between the flakes of magnetic material to thus provide a wear and corrosion resistant magnetic recording media capable of high resolution recording.

5 Claims, No Drawings

RECORDING MEDIA AND METHOD OF MAKING

BACKGROUND OF THE INVENTION

1. Field of the Invention

This invention relates to methods of making magnetic compositions and coatings for use in the preparation of magnetic recording media.

2. Description of the Prior Art

Magnetic compositions for use in preparing magnetic recording media have been prepared in numerous ways. The earliest recording media were in the form of solid magnetic wires which did not utilize coating technology. Subsequently, magnetic recording media took on the form of particulate magnetic material, in the form of magnetic oxide or magnetic metallic particles, dispersed throughout a binder or vehicle, coated on a substrate, and dried or cured while still in a dispersed state. More recently, small quantities of magnetic recording media have been prepared using various plating technologies to form thin, continuous films of magnetic metallic material on a substrate. Each of these types of media has both its advantages and its shortcomings.

Solid metallic magnetic wire provides a very efficient use of material and a high remanent moment; however, the wire has a tendency to twist or rotate in use and thus is subject to signal loss and distortion. Magnetic media formed from particulate magnetic particles dispersed in a binder and coated on a two-dimensional substrate avoids the twisting problem inherent in wire. However, particulate-binder media suffers in that it is capable in most instances of achieving relatively low coercivities, low remanent magnetization, and, due to limitations in coating technology, is subject to production as a relatively thick coating, on the order of 50 to 500 microinches thick. Coatings of this thickness are of limited utility for the recordation of high-resolution, high-density signals, such as those required in modern-day processing systems. The thickness of the media causes the broadening of magnetic signals, and thereby limits the density and resolution obtainable from thick coatings of particulate magnetic material in a binder. Additionally, particulate-binder media requires uniform dispersion of the magnetic particles throughout the binder and is subject to the existence of discontinuities of magnetic material from place-to-place in the coating. As the density of recording increases, the likelihood of a to-be-recorded signal coinciding with a magnetic discontinuity increases. When this occurs, there will be a complete loss of signal in the media and a concomitant loss of the data represented by that signal.

Various plated media have obviated some of the shortcomings of particulate media. Plated media may be provided by electroplating, electroless plating, vacuum plating, gas plating, thermal decomposition, sputtering, or other means, and is usually in the form of continuous thin films on a two-dimensional substrate. The continuity of such films avoids signal loss inherent in particulate media. The thinness of the film, normally on the order of about 500 to 5000 angstroms (between about 1 and 25 microinches), allows for high-density, high-resolution recording without the pulse broadening experienced in thicker films. However, inherent in the thin metallic nature of such coatings is their greatest shortcoming. By their very thinness, such films are subject to wear and damage from ordinary handling and use, so that their life is severely limited. Additionally, the thin metallic films are subject to deleterious oxidation and corrosion which further limits their material properties and usefulness.

Therefore, the problem of the prior art is to provide a magnetic recording media which is in the form of a thin coating having the high coercivity and remanent moment necessary for high resolution recording and which exhibits the physical characteristics of wear and corrosion resistance. As is detailed herein, such a media is provided by utilizing leafing techniques in the production of magnetic recording media.

The use of leafing metallic pigments in the production of paints and decorative coatings is a well-established art. The development of this portion of the paint industry very closely parallels in time the development of particulate magnetic recording media. Primarily, leafing techniques have been limited to the production of coatings including leafed aluminum, although leafed bronze, zinc, gold, silver, and other lustrous metallic leafing flakes have been incorporated in coatings. It is noted that the literature teaches that leafed flakes are generally a minimum of about 25 to 44 microns in diameter (corresponding to 500 mesh and 325 mesh). On a number of occasions, magnetic material in both flaked and non-flaked forms, has been included in leafing coatings to provide a physical function. In several instances, the inclusion of magnetic material in leafing paints has been coupled with the use of an external magnet to provide a substance within the wet paint which could be influenced by an external magnetic field to adjust the reflective character of the paint. In other instances, leafing magnetic material has been utilized in a coating to provide a layer for absorbing microwaves.

Despite the long parallel history of bright leafing paints and magnetic record media, and the close relationship of both of these technologies to the paint industry, there is no known instance of the application of leafing metal technology to the formation of magnetic recording media. The present invention is believed to bridge this technological gap for the first time and provides means for forming magnetic recording media utilizing a unique form of leafing technology.

SUMMARY OF THE INVENTION

The present invention provides compositions and methods for producing magnetic recording media by leafing techniques. In the practice of the present invention, finely divided metallic magnetic material, 5 microns or less in diameter, is milled with a lubricant to render them plate-like and both hydrophobic and oleophobic. The plate-like magnetic particles or flakes are then dispersed in or on a binder vehicle, including volatile solvents and coated upon a substrate. This results in the leafing of the magnetic flakes at the surface of the binder vehicle to form a thin, relatively continuous metallic magnetic layer upon the vehicle. Subsequently, the binder vehicle is cured or dried to provide an adherent layer between the substrate and the leafed magnetic flakes and also to provide for adhesion from flake-to-flake.

The resulting media may be in the form of a disk, tape, drum, loop, cylinder, stripe, strip, card, or other form. However, it is provided with a thin relatively continuous film of high coercivity magnetic metallic material firmly adhered to a substrate, which film is resistant to both abrasive wear and corrosion, due to the interaction between the flakes and the vehicle binder, and which is capable of recording high-density, high-resolution magnetic signals.

The foregoing objects, features, and advantages of the invention will be apparent from the following description of the preferred embodiments of the invention.

DESCRIPTION OF THE PREFERRED EMBODIMENT

Any malleable metallic magnetic particle having high coercivity may be used in the process of the present invention. The magnetic flake materials should have coercivities greater than about 250 oersteds so as not to be subject to demagnetizing effects. As used herein, the term "metallic" is intended to encompass not only the pure magnetic metals or non-metals, but also alloys of magnetic metals with other metals. The only requirement in this respect is that the materials be malleable and therefore subject to milling to a flake-like shape within the size range of about 0.01 to 5 microns, possess coercivity greater than 250 oersteds after milling, and be subject to leafing.

Suitable magnetic materials include certain forms of finely divided, highly magnetic iron and steel, produced, for example, by vaporization or carbonyl techniques, as well as materials produced by electrodeposition upon liquid cathodes, or from suitable baths to provide finely divided particles. Other techniques for producing finely divided magnetic materials for leafing include controlled chemical decomposition of chemical plating baths, other forms of chemical oxidation and reduction, and other techniques. Mixtures of high coercivity finally divided metallic magnetic materials are also contemplated as being within the scope of the present invention. As noted hereinabove, the initial source of magnetic material is limited only in that it must be available in finely divided form, it must be malleable, and it must retain high coercivity after being milled to a flake.

In the practice of the present invention, the magnetic metallic powders are mixed with a suitable solvent, such as mineral spirits, and a lubricant, such as stearic acid, and then milled, for example, in a steel ball mill. In the mill, the friction and hammering action of the balls reduces the powder to minute, flat, flake-like particles. During milling, the lubricant is readily absorbed by the newly formed surfaces of the magnetic particles and prevents the magnetic flakes from being welded together. When milling has proceeded to the desired point, the process is stopped and the mill sludge screened by a fine mesh sieve to eliminate larger particles and agglomerates. The final thickness and size of the flakes is a function of the amount of magnetic particles charged into the mill and the milling time.

The slurry which passes the fine mesh sieve has excess solvent removed by filtration, with the particles forming a filter cake containing about 80 percent to 90 percent, by weight, magnetic flakes, the balance being absorbed lubricant and retained solvent. At this point, if dry magnetic powder flakes are desired, the remaining solvents in the filter cake may be removed under vacuum conditions. Finally, the filter cake is normally thinned with clean mineral spirits or other solvent to a paste containing 60 to 70 percent magnetic flakes, by weight.

When this paste of leafing magnetic flakes is mixed with a suitable leafing binder vehicle and solvent, the flakes will float to the surface of the vehicle and orient themselves parallel with the surface to produce a bright, level, relatively continuous, thin magnetic film. The flakes in the leafing layers are normally on the order of about 0.001 to about 1.0 micron thick, while the flake diameter is in the range of about 0.01 to 5 microns. Flake diameters of about 0.1 to about 1 micron and flake thicknesses of 0.01 to 0.2 micron are preferred. Flakes having a diameter greater than about 5 microns cannot be tolerated as they tend to lose the desired magnetic characteristics, and limit signal density and resolution. The magnetic flakes are arranged in layers of from about 5 to 15 particles deep, with a thin coating of vehicle between each flake and layer. Due to the formation of this multiple overlapping layer structure and the coating on each flake, the continuity of magnetic materials in the coating is exceptionally high. The film is thin and exhibits physical strength and durability, while the flakes are protected from corrosion and wear. The thickness of the flake coating ranges from about 0.005 to 3 microns thick.

The leafing characteristics exhibited by these coatings is the result of the magnetic flakes rising to the vehicle's surface and remaining there. The flake particles rise because of convection currents existing in the binder vehicle due to solvent evaporation. The speed of travel of the magnetic flakes through the binder vehicle depends upon the vehicle's chemical make-up, the character of the solvent, and the viscosity of the system. High speed flake travel is encouraged by a low viscosity system which exhibits high surface tension, high density, and a high rate of solvent evaporation. Modification of these vehicle and solvent characteristics will have a direct effect upon the speed of migration of the magnetic flakes within the binder vehicle. The leafing tendency of the flakes is also the greatest where these magnetic particles exhibit minimum thickness and maximum area.

The propensity of the magnetic flakes to stay at the surface of the vehicle is due to the interfacial tension between the flake surface and the binder vehicle. At the vehicle's surface, each magnetic flake makes a finite contact angle with the binder vehicle due to the absorbed lubricant film on the flake. Additionally, the vertical component of the surface tension of the vehicle acting along the line of contact between the magnetic flake and the binder vehicle, and the upward hydrostatic head of the vehicle, which is a function of the binder vehicle density, serves to cause the flake to remain at the surface of the vehicle.

The binder vehicle chosen must not only serve to give the requisite mechanical strength and adhesion to the leafed magnetic articles when dry and cured, but also must be compatible with the lubricant utilized in producing the leafed particles. For example, where stearic acid is the lubricant of choice, it primarily comprises a soft absorbed film at the surface of the platelet, although some evidence of chemical reaction exists. The destruction of this film can be caused quite easily by either mechanical or chemical means. Extended contact with strong acids, moisture, polar solvents, lead compounds, as well as strong agitation, and aeration can effectively destroy this film. Unsaturated fatty acids and short-chained fatty acids are also detrimental to the leafing quality of the flakes. Therefore, a binder vehicle must be chosen which avoids these destructive forces and which can be mixed with the flakes with a minimum of grinding, moisture, and air.

Binder vehicles of choice will have a high surface tension and include solvents which also exhibit high surface tensions. As a choice of solvent, any of a large number of oils can be employed, specifically, a large variety of hydrocarbon solvents. The selection of a suitable solvent of this type does not involve critical requirements, but rather a choice among many known liquid solvents, to suit such factors as toxicity, cost, and convenience in the preparation of the specific coating composition. Among the large variety of known and suitable solvents are high-grade volatile mineral spirits, aromatic petroleum solvents, straight aromatic solvents, or high-flash solvent naptha. Specific examples of these solvents include xylol, turpentine, and benzol. Other hydrocarbon solvents that can be employed are toluene, xylene, petroleum aliphatic naptha, and petroleum aromatic naptha. In some cases, the solvent may be or include polar solvents if their contact with the flakes is minimized.

Dispersion of the magnetic flakes or paste in the vehicle is accomplished by simple mixing. Preferably, the vehicle is added to the magnetic flakes. The desired amount of each component is determined prior to mixing, measured, and mixed with steady gentle stirring, avoiding excessive agitation.

Among vehicles suitable for use in the practice of the present invention are phenolic resins, silicone resins, alkyd resins, the various latex emulsions, resins, polyester resins, polyurethane resins, and epoxies. Other typical, but not limiting, vehicles for use singularly, or in combination for preparing various recording media are cellulose esters and ethers, vinyl chloride, vinyl acetate, acrylate and styrene polymers and copolymers, polyamides, aromatic polycarbonates, and polyphenol ethers.

Suitable lubricants for use in the practice of the present invention include alkyl and alkenyl fatty acids having from 14 to 22 carbon atoms in the alkyl or alkenyl chain. Specific examples are stearic acid, or its equivalent, which is most commonly used, and also other fatty acids, such as oleic, lauric, myristic, behenic, palmitic, and ricinoleic. The materials used in the practice of this invention may be pure, or they may be of commerical quality. For example, commercially available stearic acid also contains small amounts of palmitic and oleic acids intermixed as a constituent thereof. Not only can mixtures of the fatty acids be utilized in the practice of this invention, but also derivatives of the fatty acids, such as the metal soaps, can be used with facility. Other useful lubricants include petroleum lubricants, such as ordinary lubricating oils and greases, or hydrogenated vegetable oils. Fluorocarbon resins are also suitable for use as lubricants in the practice of the present invention. Conveniently, the total quantity of lubricants in the flake paste produced by the milling operation may be in the range of about 1 percent to about 10 percent, by weight, of the magnetic flakes present.

While ball milling has been indicated as being the most common mode of practice of this invention, it is to be understood that that is only one conventional method of preparing leafing magnetic flakes and that there are other procedures, such as the use of hammer stampers, dry stampers, and attritors which give equivalent results. Time of milling can range from several hours to several days depending upon the method chosen, the amount of charge in the mill, and the speed at which the mill is run. It is not uncommon to include projections known as "lifters" within the ball mill along its walls to provide means to lift the balls, and thus allow them to cascade or cataract onto the balls below with the greatest impact.

Once prepared, the flake-binder vehicle dispersion may be applied to a suitable substrate by roller coating, gravure coating, knife coating, or spraying, or by other known methods. The terms "dry" and "cure" as applied to the binder vehicle are each intended to encompass the drying or curing process which is suitable for providing a stable binder coating.

In preparing recording media, the magnetic flakes usually compromise about 25–90 percent, by weight, of the solids in the mixture applied to the substrate; although, shortly after coating, leafing takes place so that from about 50 percent to 90 percent of the flakes rise to the surface of the binder vehicle. The substrate upon which the mixture is coated is often a flexible resin, such as polyester or cellulose acetate material; although, other flexible materials, as well as rigid base materials, are more suitable for some uses. The specific choice of non-magnetic substrate, vehicle, solvents, or method of application of the magnetic composition to the support will vary with the properties desired and the specific form of magnetic recording media being produced. Although not described in detail, other ingredients and additives may be added to the mixture as stabilizers, contact lubricants, or for other purposes.

The following examples are illustrative of the present invention:

EXAMPLE I

Magnetic cobalt-phosphorous was prepared from a solution similar to those used in the preparation of plated material by chemical reduction. The solution contained cobalt ions and hypophosphite reducing agent, citrate complexing agent, and ammonium hydroxide to control the pH of the solution. Decomposition of the bath with the resulting formation of fine powdered magnetic material was induced by raising the temperature of the solution near its boiling point and by adding small quantities of palladious chloride to the solution. The resulting particles had an average size of about 0.1 micron, a density of 7.9 grams per cc, and an intrinsic coercivity of about 825 oersteds as measured on a vibrating sample magnetometer at 4,000 oersteds.

A sample of this cobalt-phosphorous weighing 650 grams was placed into a 1.3 gallon steel ball mill fitted with lifters and loaded with 15 pounds of ⅜ inch stainless-steel balls. 20 grams of stearic acid powder and 350 grams of mineral spirits were also introduced into the ball mill. The mill was rotated at a speed of 103 revolutions per minute, which was sufficient to produce cataracting of the steel balls and result in a maximum impacting condition between the balls in the mill. Milling under these conditions was carried out for 48 hours, and the wet slurry of cobalt-phosphorous flakes was removed from the mill, washed with fresh mineral spirits, and filtered to form a cake of approximately 80 percent pigment, by weight. To this cake was then added slowly, with gentle mixing to provide smooth dispersion, a freshly prepared 50 percent solution of equal parts of Mondur CB-75, castor oil, and toluene solvent. Mondur CB-75 as supplied by Mobay Chemical Company is a trifunctional isocyanate prepolymer of toluene diisocyanate and trimethylol propane. The cobalt-phosphorous flakes constituted about 70 percent, by weight, of the solids in this mixture. The resulting coating was applied to a flexible 1.5 mil thick biaxially oriented polyethylene terphthlate film by conventional knife coating techniques to a wet thickness of about 1000 micro-inches.

Immediately after application, the cobalt-phosphorous flakes were noted to rise to the surface of the binder vehicle in the form of what appeared to be a substantially continuous reflective metallic film. After drying and curing were completed, the binder vehicle was found to be in the form of a flexible cross-linked polyurethane. The coating was inspected by electron micrograph and found to have a total thickness of 200 microinches, with approximately 90 percent of the cobalt-phosphorous particles at the surface in a layer having a thickness in the range of about 0.5 to 0.8 micron. When slit to form magnetic recording media, the media was found to have an intrinsic coercivity of 719 oersteds and a squareness ratio of 0.34. It was capable of passing a recording head repeatedly without visible wear and recorded data at a rate of 1600 flux changes per inch with excellent results.

As previously noted, the surface of the media had the appearance of a substantially continuous reflective metallic film; however, when examined under an optical microscope, it was found to consist of discrete particles, each particle apparently in its own thin polymer or lubricant package. When subjected to temperature and humidity conditions of 85° C and 85 percent R.H. for 24 hours, the media showed no signs of detrimental oxidation or corrosion.

EXAMPLE II

Using the same source of cobalt-phosphorous particles as in Example I, magnetic flakes were prepared as in Example I, and the flakes mixed with a 50 percent solution of Epon 1001 and Versamid 115. Epon 1001, as supplied by Shell Chemical Company, is an epoxy terminated reaction product of bisphenol A and epichlorohydrin. Versamid 115, as supplied by General Mills, is a polyamide. This mixture was coated on a smooth brass disk with a standard spraying technique to a wet thickness of approximately 1.5 mil. Immediately after coating, the metallic cobalt-phosphorous flakes were noted to appear at the surface of the vehicle binder.

As in Example I, after the vehicle was dried and cured to form a crosslinked epoxy, the media so produced exhibited excellent recording characteristics, good wear and corrosion resistance, and was fully useful as a high-resolution recording media. An ultramicrotomed cross section of the media indicated the coating had a final dry thickness of about 300 microinches, with the metallic film having a thickness of about 0.3 to 0.6 micron. The magnetic film appeared to contain approximately 80 percent of the cobalt-phosphorous flakes.

Other media were prepared utilizing other high coercivity metallic particles (greater than 250 oersteds and smaller than 5 microns) differing from cobalt-phosphorous and produced by other techniques. The metallic magnetic particles were converted to flakes as taught herein, using both stearic acid and other lubricants during the milling process. The resulting flakes were dispersed in various binder vehicles and coated on several different types of substrates. In some instances, the binder was coated on the substrate first followed by a coating of flaked magnetic particles in a solvent. All produced excellent high resolution recording media exhibiting good wear and corrosion resistance.

EXAMPLE III

The techniques of the present invention were applied to several low coercivity magnetic materials to determine their ability to produce high resolution recording media. Samples of nickel having a coercivity less than 200 oersteds, iron powder having a coercivity less than 100 oersteds, permalloy iron-nickel having a coercivity of less than 50 oersteds and steel having a coercivity less than 10 oersteds were obtained from various sources, comminuted to a size less than 5 microns by ordinary milling techniques, and then milled utilizing lubricants and solvents as in Example I. The resulting flakes were formed into a dispersion with castor oil and Mondur CB-75, coated on substrates and dried, as in Example I. Each of the resulting media was fully reflective and magnetic; but when tested for high resolution recording, they were found to be entirely inadequate due to demagnetization effects.

Other modifications of and variations in the procedure and resulting pigment and coating material will also be apparent to those skilled in the art without departing from the spirit of this invention. While preferred procedures and materials have been described with considerable particularity, the invention is not restricted thereto, but illustrations given are to be taken as representative of the scope and character of the invention with the recognition that equivalent procedures and materials may be used. Certain features of the invention may be used without other features, and changes may be made as respects details of procedure and material without departing from the spirit of this invention. Reference is therefore to be had to the appended claims for a definition of the invention.

What is claimed is:

1. The method of making magnetic recording media consisting essentially of the steps of:

subjecting finely divided, metallic magnetic particles having coercivities greater than about 250 oersteds to mechanical milling in the presence of a leafing lubricant and a volatile solvent to produce flakes having diameters in the range of about 0.01 to 5 microns, thickness in the range of about 0.001 to 0.2 micron, coercivities greater than 250 oersteds, and having on their surfaces a leafing lubricant film;

mixing said flakes with a non-magnetic binder vehicle and a volatile solvent, said binder being of different composition than said leafing lubricant;

coating the mixture onto a non-magnetic substrate;

allowing the metallic magnetic flakes to leaf to the surface of the coating mixture; and then drying said coating mixture.

2. Magnetic recording media consisting essentially of:

a non-magnetic substrate;

a non-magnetic binder vehicle adherently coated upon said substrate; and a relatively continuous layer of metallic magnetic particles, said layer of particles being about 0.005 to 3 microns thick and having a coercivity greater than 250 oersteds, said layer of metallic magnetic particles being supported in and upon said binder vehicle with said binder vehicle serving to join said particles together, said magnetic particles being formed of flakes, said flakes being about 0.01 to 5 microns in diameter, about 0.001 to 1 micron in thickness, and having on their surfaces a leafing lubricant film, said leafing lubricant being of different composition than said non-magnetic binder.

3. The magnetic recording media of claim 2 wherein the magnetic particles are about 0.01 to 1 micron in diameter and about 0.01 to 0.2 micron thick.

4. The magnetic recording media of claim 2 wherein the magnetic particles are cobalt-phosphorous produced by chemical reduction from an aqueous cobalt bath.

5. The magnetic recording media of claim 2 wherein the binder vehicle is selected from the group consisting of polyurethane and epoxy polymers.

* * * * *